United States Patent
Moradnia et al.

(10) Patent No.: US 11,440,488 B2
(45) Date of Patent: Sep. 13, 2022

(54) ACTIVE GUTTER, DEFLECTOR, AND GUARD FOR A VEHICLE

(71) Applicant: Honda Motor Co., Ltd., Tokyo (JP)

(72) Inventors: Pirooz Moradnia, Dublin, OH (US); Matthew L. Metka, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/147,187

(22) Filed: Jan. 12, 2021

(65) Prior Publication Data
US 2022/0219758 A1    Jul. 14, 2022

(51) Int. Cl.
| | | |
|---|---|---|
| B60R 13/07 | (2006.01) | |
| B62D 25/04 | (2006.01) | |
| B62D 35/00 | (2006.01) | |
| B60R 16/08 | (2006.01) | |
| B60J 7/00 | (2006.01) | |

(52) U.S. Cl.
CPC ............ B60R 13/07 (2013.01); B60J 7/0084 (2013.01); B60R 16/08 (2013.01); B62D 25/04 (2013.01); B62D 35/005 (2013.01)

(58) Field of Classification Search
CPC ........ B60J 7/0084; B60R 13/07; B60R 16/08; B62D 35/00; B62D 35/002; B62D 35/003; B62D 35/005; B62D 35/008
USPC ................ 296/180.1–180.5, 213, 91, 193.06
See application file for complete search history.

(56) References Cited

U.S. PATENT DOCUMENTS

| | | | |
|---|---|---|---|
| 5,118,157 A | 6/1992 | Tamura | |
| 6,899,376 B1 | 5/2005 | Sullivan | |
| 7,367,609 B2 | 5/2008 | Grudzinski et al. | |
| 8,146,979 B2 | 4/2012 | Renke et al. | |
| 8,454,083 B2 | 6/2013 | Dimitriou et al. | |
| 10,173,510 B2 | 1/2019 | Vojtisek et al. | |
| 10,449,912 B2 | 10/2019 | Okabe et al. | |
| 10,589,610 B2 | 3/2020 | Takashi | |
| 10,597,088 B2 | 3/2020 | Gulker et al. | |

(Continued)

FOREIGN PATENT DOCUMENTS

| | | |
|---|---|---|
| DE | 3119358 | 12/1982 |
| DE | 3936372 | 5/1991 |

(Continued)

OTHER PUBLICATIONS

EZE-RV Gutter System—10' Package, Ultra White|Camping World, date printed May 4, 2020, https://www.campingworld.com/eze-rv-gutter-system10%27-package--ultra-white-16962.html.

(Continued)

*Primary Examiner* — Dennis H Redder
(74) *Attorney, Agent, or Firm* — Rankin, Hill & Clark LLP

(57) ABSTRACT

A fin assembly of a vehicle includes a fin supported on an A-pillar and disposed along the A-pillar at a location that is interposed between and separates a side window and a windshield in a lateral direction of the vehicle. The fin is configured for being driven to a retracted condition with respect to the A-pillar where an exterior surface of the vehicle at least partially formed along an exterior surface of the windshield, an exterior surface of the fin, and an exterior surface of the side window substantially conforms to an aerodynamic shape, and for being driven to an extended condition where the exterior surface of the vehicle is at least partially formed along the exterior surface of the windshield, an exterior surface of the A-pillar located behind the fin in a front-back direction of the vehicle, and the exterior surface of the side window.

18 Claims, 6 Drawing Sheets

(56) References Cited

U.S. PATENT DOCUMENTS

2010/0320796 A1  12/2010  Hoefer et al.
2016/0129771 A1   5/2016  Nakai et al.

FOREIGN PATENT DOCUMENTS

| | | |
|---|---|---|
| DE | 4307303 | 9/1994 |
| DE | 102004042703 | 3/2006 |
| DE | 19907390 | 8/2008 |
| DE | 102009009469 | 8/2010 |
| DE | 102012221993 | 6/2014 |
| DE | 102012221994 | 6/2014 |
| DE | 102012221995 | 6/2014 |
| DE | 102014017103 | 5/2016 |
| EP | 0952018 | 10/1999 |
| EP | 2353903 | 8/2011 |
| EP | 2429862 | 3/2012 |
| JP | H11334358 | 12/1999 |
| JP | 2010058656 | 3/2010 |
| KR | 19980010798 | 5/1998 |
| KR | 200145667 | 6/1999 |
| KR | 10-0291061 | 6/2001 |
| KR | 100494729 | 6/2005 |
| KR | 101324324 | 11/2013 |
| KR | 20140029802 | 3/2014 |

OTHER PUBLICATIONS

National Guard, Dark Bronze Rain Drip Guard, Flange Height ⅝", Projection 2-½", Length 76", date printed May 4, 2020, https://www.grainger.com/product/NATIONAL-GUARD-Dark-Bronze-Rain-Drip-Guard-45AA36.

ACTIVE GUTTER, DEFLECTOR, AND GUARD FOR A VEHICLE

BACKGROUND

For improved performance and efficiency, vehicles are incentivized to adopt aerodynamic shapes featuring a smooth exterior surface, including the exterior surface between a windshield and side windows. For improved driver visibility through side windows in raining weather conditions, vehicles are also incentivized to adopt elements such as gutter channels interposed between the windshield and the side windows along the exterior surface. Gutter channels interposed between the windshield and a side window are configured for preventing rain from sliding across the exterior surface of the vehicle, from the windshield to the side window.

Known gutter channels are formed from static incongruities in paneling along the exterior surface of the vehicle to catch rain water between the windshield and a window, and guide the caught rain water over a top of the vehicle using the headwind of the vehicle. While known gutter channels may successfully prevent rain on the front of the vehicle from sliding to the side windows in raining weather conditions, the static incongruities forming the gutter channels disrupt the otherwise smooth exterior surface and reduce an aerodynamic aspect thereof, even when the vehicle is driven outside raining weather conditions.

BRIEF DESCRIPTION

According to one aspect, a fin assembly for a vehicle includes a fin supported on an A-pillar and disposed along the A-pillar at a location that is interposed between and separates a side window and a windshield in a lateral direction of the vehicle, with a first lateral side of the fin being located closer to the side window as compared to the windshield, and with a second lateral side of the fin being located closer to the windshield as compared to the side window. The fin is configured for being driven to a retracted condition with respect to the A-pillar such that an exterior surface of the vehicle at least partially formed along an exterior surface of the windshield, an exterior surface of the fin, and an exterior surface of the side window substantially conforms to an aerodynamic shape. The fin is configured for being driven to an extended condition with respect to the A-pillar such that the exterior surface of the vehicle is at least partially formed along the exterior surface of the windshield, an exterior surface of the A-pillar located behind the fin in a front-back direction of the vehicle, and the exterior surface of the side window, and such that at least one of the first lateral side of the fin and the second lateral side of the fin is spaced outward from the exterior surface of the A-pillar to prevent liquid from traveling around the A-pillar from the windshield to the side window.

According to another aspect, a fin assembly for a vehicle includes a fin supported on an A-pillar and disposed along the A-pillar at a location that is interposed between and separates a side window and a windshield in a lateral direction of the vehicle, with a first lateral side of the fin being located closer to the side window as compared to the windshield, and with a second lateral side of the fin being located closer to the windshield as compared to the side window. The fin is configured for being driven to a retracted condition with respect to the A-pillar such that an exterior surface of the vehicle is at least partially formed along an exterior surface of the windshield, an exterior surface of the fin, and an exterior surface of the side window in the lateral direction of the vehicle, the exterior surface of the fin being flush with the exterior surface of the windshield and the exterior surface of the side window. The fin is configured for being driven to an extended condition with respect to the A-pillar such that the exterior surface of the vehicle is at least partially formed along the exterior surface of the windshield, an exterior surface of the A-pillar located behind the fin in a front-back direction of the windshield, and the exterior surface of the side window, and at least one of the first lateral side of the fin and the second lateral side of the fin is spaced outward from the exterior surface of the A-pillar to prevent liquid from traveling around the A-pillar from the windshield to the side window.

According to one aspect, a method of operating a fin assembly for a vehicle includes providing a fin supported on an A-pillar such that the fin is interposed between and separates a windshield from a side window in a lateral direction of the vehicle, wherein a first lateral side of the fin is located closer to the side window as compared to the windshield, and a second lateral side of the fin is located closer to the windshield as compared to the side window, and providing a sensor disposed on the windshield, wherein the sensor is configured to detect an amount of liquid on the windshield. The method also includes driving the fin to a retracted condition with respect to the A-pillar in response to at least one of a first user command and an input from the sensor such that an exterior surface of the vehicle at least partially formed from an exterior surface of the windshield, an exterior surface of the fin, and an exterior surface of a side window substantially conforms to an aerodynamic shape, and driving the fin to an extended condition with respect to the A-pillar in response to at least one of a user command and an input from the sensor such that that the exterior surface of the vehicle is at least partially formed along the exterior surface of the windshield, an exterior surface of the A-pillar located behind the fin in a front-back direction of the vehicle, and the exterior surface of the side window, wherein at least one of a first lateral side of the fin and a second lateral side of the fin are spaced outward from the exterior surface of the A-pillar.

DETAILED DESCRIPTION

Figure 1:
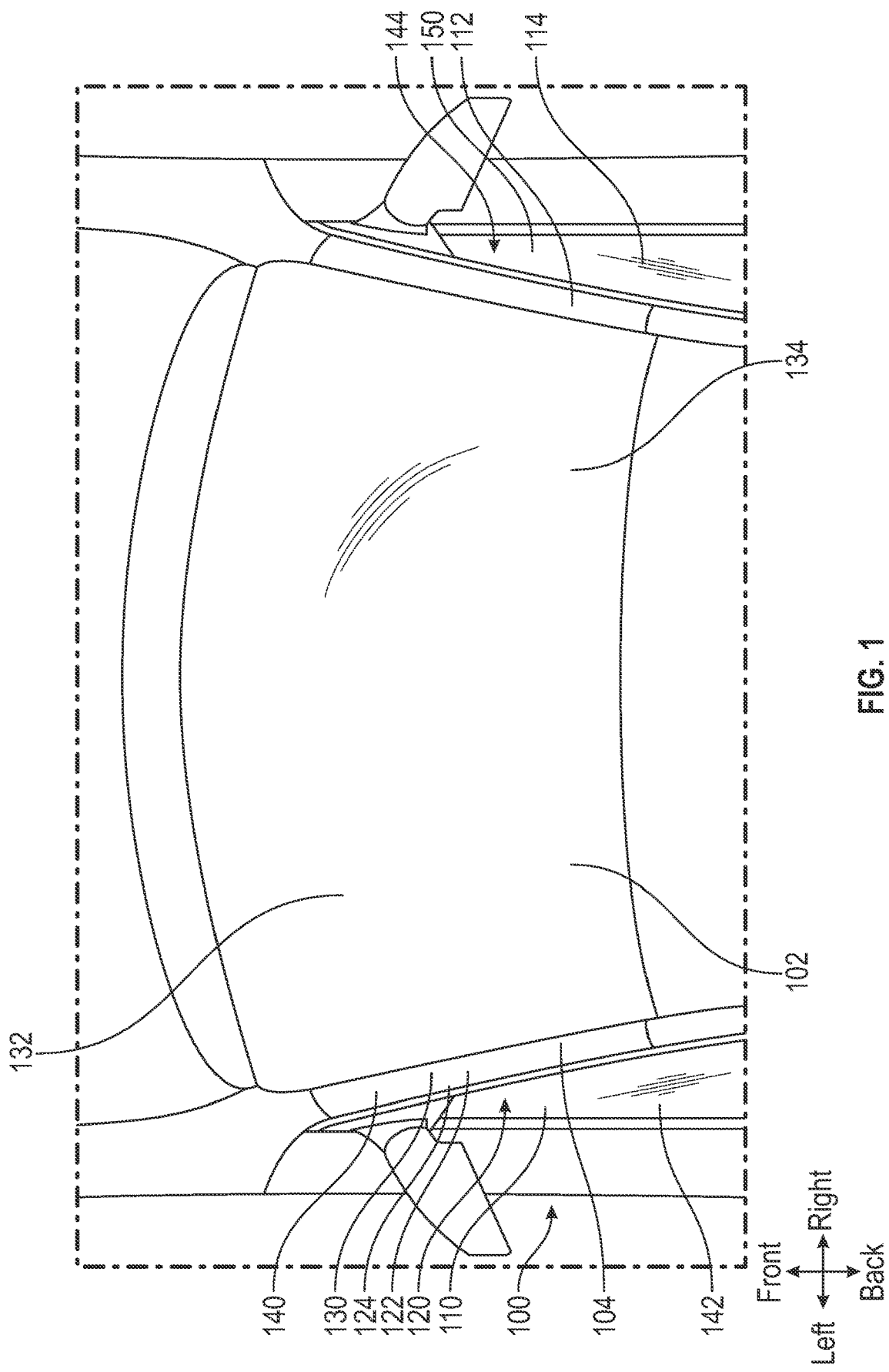
FIG. 1 is a top partial view of a vehicle including a first fin assembly and a second fin assembly.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a vehicle 100 including a windshield 102, a first A-pillar 104, a first side window 110, a second A-pillar 112, and a second side window 114.

The first A-pillar 104 is interposed between and separates the windshield 102 from the first side window 110 in a lateral direction of the vehicle 100, specifically in a right-left direction of the vehicle 100. A first fin assembly 120 includes a fin 122 supported on the first A-pillar 104 and disposed along the first A-pillar 104 at a location that is interposed between and separates the first side window 110 and a windshield 102 in the lateral direction of the vehicle 100, with a first lateral side 124 of the fin 122 being located closer to the first side window 110 as compared to the windshield 102 and a second lateral side 130 of the fin 122 being located closer to the windshield 102 as compared to the first side window 110.

An exterior surface 132 of the vehicle 100 includes an exterior surface 134 of the windshield 102, an exterior surface 140 of the fin 122, and an exterior surface 142 of the first side window 110 along the right-left direction of the vehicle 100. As depicted, the exterior surface 140 of the fin 122 is substantially flush with the exterior surface 134 of the windshield 102 and the exterior surface 142 of the first side window 110 such that an aerodynamic curve of the exterior surface 132 of the vehicle 100 is substantially continuous from the exterior surface 134 of the windshield 102 to the exterior surface 142 of the first side window 110 across the exterior surface 140 of the fin 122.

The second A-pillar 112, the second side window 114 and a second fin assembly 144 located at the second A-pillar 112 respectively feature a construction similar to the first A-pillar 104 and the first side window 110, having an orientation opposite from the first A-pillar 104, the first side window 110, and the first fin assembly 120 with respect to the lateral direction of the vehicle 100. In this manner, the second A-pillar 112 is interposed between and separates the windshield 102 from the second side window 114 in the lateral direction of the vehicle 100, specifically the left-right direction of the vehicle 100. Unless otherwise stated, the following description made with reference to the first A-pillar 104, the first side window 110 and first fin assembly 120 respectively is similarly applicable to the second A-pillar 112, the second side window 114, and the second fin assembly 144.

The windshield 102 is interposed between and separates the first A-pillar 104 and the second A-pillar 112 in the lateral direction of the vehicle 100, and the exterior surface 134 of the windshield 102 is continuous between the first A-pillar 104 and the second A-pillar 112 in the lateral direction of the vehicle 100. As such, an aerodynamic curve of the exterior surface 132 of the vehicle 100 is substantially continuous from the first fin assembly 120 to the second fin assembly 144 across the windshield 102 in the lateral direction of the vehicle 100, and is further substantially continuous from the exterior surface 142 of the first side window 110 to an exterior surface 150 of the second side window 114 across the first fin assembly 120, the exterior surface 134 of the windshield 102, and the second fin assembly 144 in the lateral direction of the vehicle 100.

Figure 2:
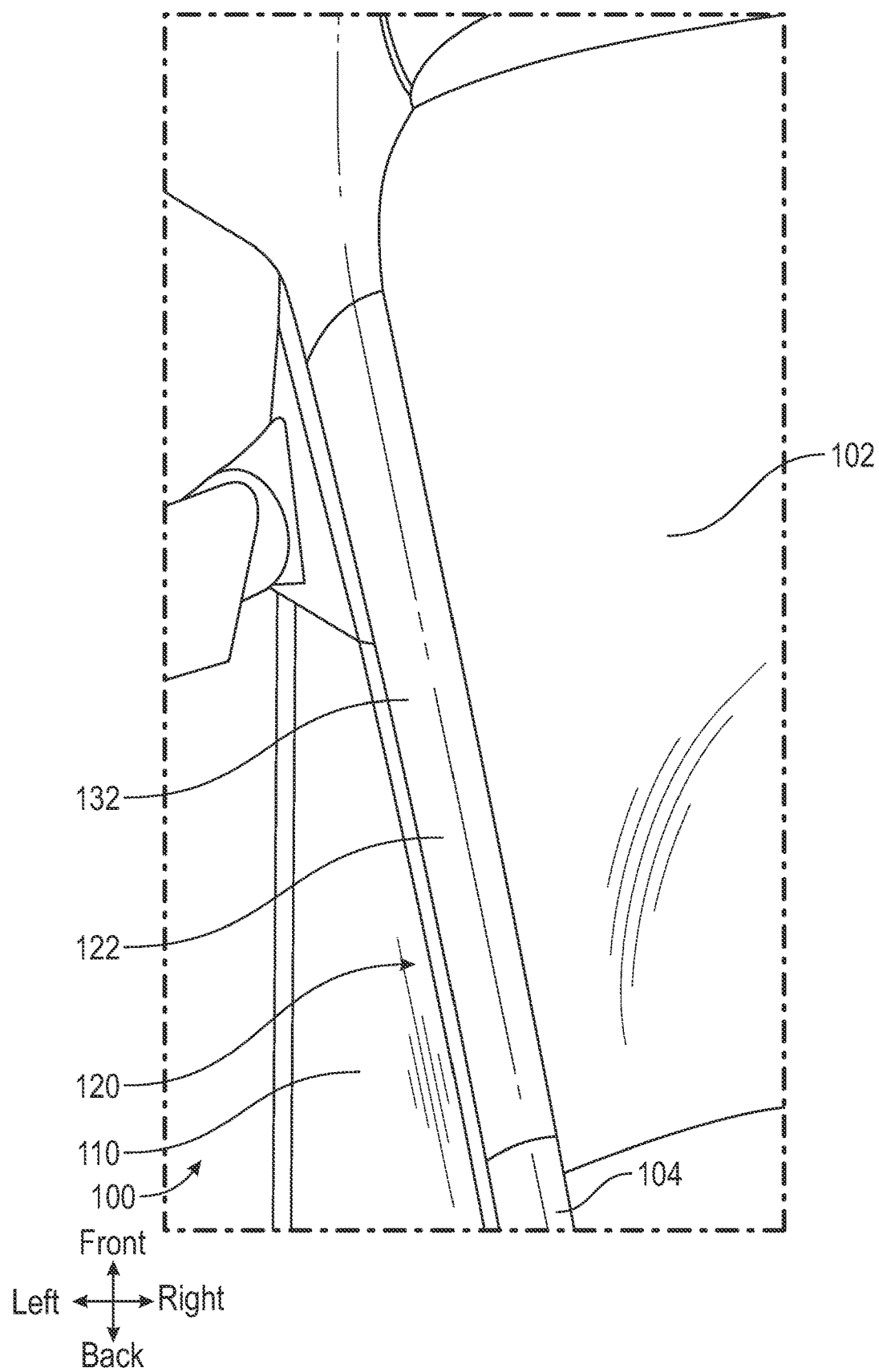
FIG. 2 is a top view of the first fin assembly with a first fin in a retracted condition.

As depicted in FIG. 2, the first fin assembly 120 includes the fin 122 disposed over the first A-pillar 104 in a retracted condition with respect to the first A-pillar 104 such that the fin 122 at least partially forms the exterior surface 132 of the vehicle 100 at a location that is interposed between and separates the windshield 102 and the first side window 110 in the right-left direction of the vehicle 100. In this manner, the exterior surface 132 of the vehicle 100 is at least partially formed by the windshield 102, the fin 122, and the first side window 110 in the right-left direction of the vehicle 100 when the fin 122 is in the retracted condition.

Figure 3:
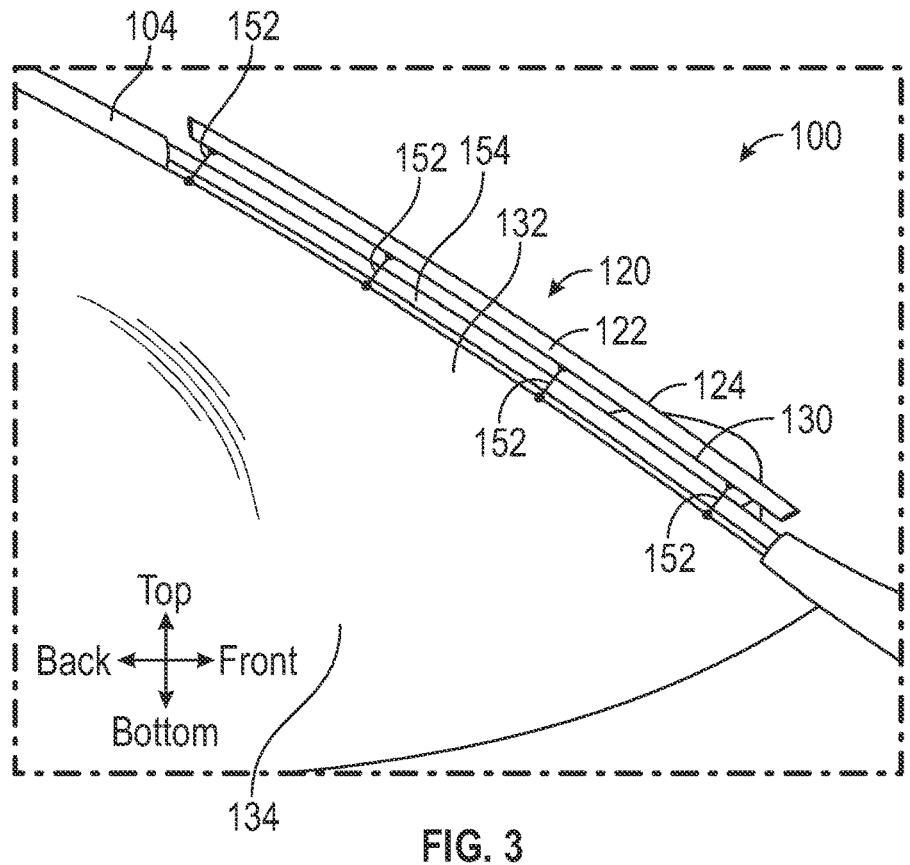
FIG. 3 is a perspective view of the first fin assembly with the first fin in an extended condition.

FIG. 3 depicts the fin 122 in an extended condition with respect to the first A-pillar 104. When the fin 122 is in the extended condition, an arm 152 supports the fin 122 such that the exterior surface 132 of the vehicle 100 is at least partially formed along the exterior surface 134 of the windshield 102, an exterior surface 154 of the first A-pillar 104 located behind the fin 122 in a front-back direction of the vehicle 100. The arm 152 supports at least one of the first lateral side 124 of the fin 122 and the second lateral side 130 of the fin 122 spaced outward from the exterior surface 154 of the first A-pillar 104. As such, when the fin 122 is in the extended condition, the fin 122 is configured to substantially prevent liquid traveling with a headwind of the vehicle 100 across the windshield 102 in the lateral direction of the vehicle 100 from contacting the first side window 110. As depicted, the arm 152 is a plurality of arms 152 disposed between the first A-pillar 104 and the fin 122, along the windshield 102 and the first side window 110 in the front-back direction of the vehicle 100 and the top-bottom direction of the vehicle 100.

Figure 4:
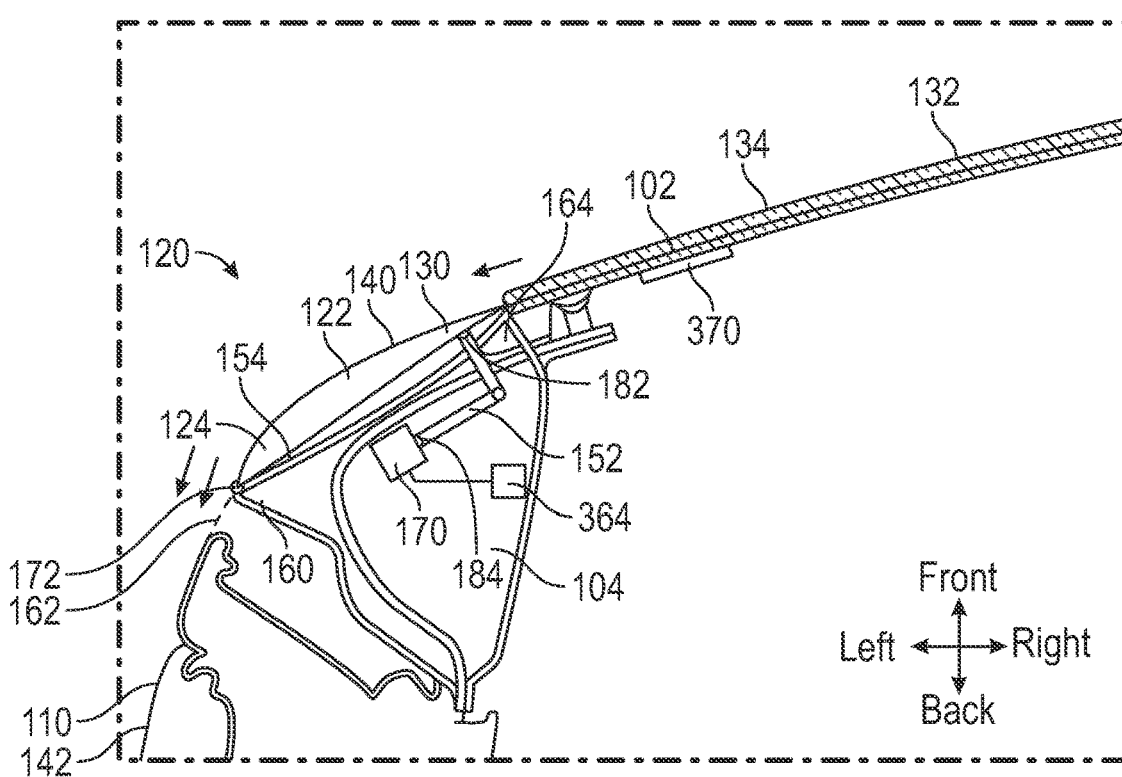
FIG. 4 is a cross-sectional view of an embodiment of the first fin assembly with the first fin in the retracted condition.

FIG. 4 depicts a cross-sectional view of the first fin assembly 120 with the fin 122 in the retracted condition. As depicted, when the fin 122 is in the retracted condition the exterior surface 140 of the fin 122 is aligned with the exterior surface 142 of the first side window 110 at the first lateral side 124 of the fin 122 such that the exterior surface 140 of the fin 122 substantially continues a curve of the exterior surface 142 of the first side window 110 at the first lateral side 124 of the fin 122. To this end, the first lateral side 124 of the fin 122 is retracted rearward in the front-back direction of the vehicle 100, toward the first A-pillar 104 such that the first lateral side 124 of the fin 122 contacts the exterior surface 154 of the first A-pillar 104 at a first lateral side 160 of the first A-pillar 104 located closer to the first side window 110 as compared to the windshield 102 in the lateral direction of the vehicle 100. As such, the exterior surface 132 of the vehicle 100 is substantially continuous from the exterior surface 142 of the first side window 110 to the first lateral side 124 of the fin 122 and substantially conforms to an aerodynamic shape 162 configured to facilitate and maintain attachment of the headwind to the exterior surface 132 of the vehicle 100.

Also, the exterior surface 140 of the fin 122 is aligned with the exterior surface 134 of the windshield 102 at the second lateral side 130 of the fin 122 such that the exterior surface 140 of the fin 122 continues a curve of the exterior surface of the windshield 102 at the second lateral side 130 of the fin 122. To this end, the second lateral side 130 of the fin 122 is retracted rearward in the front-back direction of the vehicle 100, toward the first A-pillar 104 such that the second lateral side 130 of the fin 122 contacts the windshield 102 and the exterior surface 154 of the first A-pillar 104 at a second lateral side 164 of the first A-pillar 104 located closer to the windshield 102 as compared to the first side window 110 in the lateral direction of the vehicle 100. As such, the exterior surface 132 of the vehicle 100 is substantially continuous from the exterior surface 134 of the windshield 102 to the second lateral side 130 of the fin 122 and substantially conforms to the aerodynamic shape 162.

Further, the exterior surface 140 of the fin 122 is substantially continuous from the first lateral side 124 of the fin 122 to the second lateral side 130 of the fin 122, and when the fin 122 is in the retracted condition the exterior surface 140 of the fin substantially conforms to the aerodynamic shape 162. As such, the exterior surface 132 of the vehicle 100 at least partially formed along the exterior surface 134 of the windshield 102, the exterior surface 140 of the fin 122, and the exterior surface 142 of the first side window 110 substantially conforms to the aerodynamic shape 162 and is configured to facilitate and maintain attachment of the headwind to the exterior surface 132 of the vehicle 100.

The arm 152 is fixed to the first A-pillar 104 so as to support the fin 122 on the first A-pillar 104 in the retracted condition and the extended condition, and mechanically connect the fin 122 to a motor 170 such that the motor 170 is configured to drive the fin 122 with the arm 152 to and between the retracted condition and the extended condition. In this manner the motor 170 is mechanically connected to the fin 122 through the arm 152, the motor 170 being configured to drive the fin 122 with the arm 152 to and between the retracted position and the extended position.

The motor 170 is disposed in the first A-pillar 104, below the fin 122 in a top-bottom direction of the vehicle 100 and behind the fin 122 in the front-back direction of the vehicle 100, and the arm 152 extends directly from the motor 170 to support the fin 122 on the first A-pillar 104. In alternative embodiments, the motor 170 may be alternatively arranged in positions located throughout the first fin assembly 120 and the vehicle 100. In further alternative embodiments, the first fin assembly 120 includes a plurality of arms and motors respectively having a similar construction to the arm 152 and the motor 170, and respectively arranged throughout the vehicle for driving the fin 122 to and between the extended condition and the retracted condition.

With continued reference to FIG. 4, the first lateral side 124 of the fin 122 is fixed to the first A-pillar 104 via a joint 172 at the first lateral side 160 of the first A-pillar 104, and the arm 152 supports the fin 122 on the first A-pillar 104 at the second lateral side 130 of the fin 122 such that when the fin 122 is driven from the retracted condition to the extended condition the fin 122 pivots in an outboard direction of the vehicle 100 at the joint 172, and when the fin 122 is driven from the extended condition to the retracted condition the fin 122 rotates in an inboard direction of the vehicle 100.

As depicted, the arm 152 is a two bar mechanism configured for extending and retracting a distal end 182 of the arm 152 fixed to the fin 122, relative to a proximal end 184 of the arm 152 with respect to the first A-pillar 104 and the motor 170, as driven by the motor 170. Notably, the arm 152 may additionally or alternatively feature a one bar mechanism, a three bar mechanism, a four bar mechanism, and/or a telescoping mechanism to for extending and retracting the distal end 182 of the arm 152 without departing from the scope of the present disclosure. In further alternative embodiments of the first fin assembly 120, the fin 122 is configured to spin around a pivot, and the first fin assembly 120 includes a configuration of electromagnets and loaded springs for driving the fin 122 in addition or as an alternative to the arm 152 and the motor 170.

Figure 5:
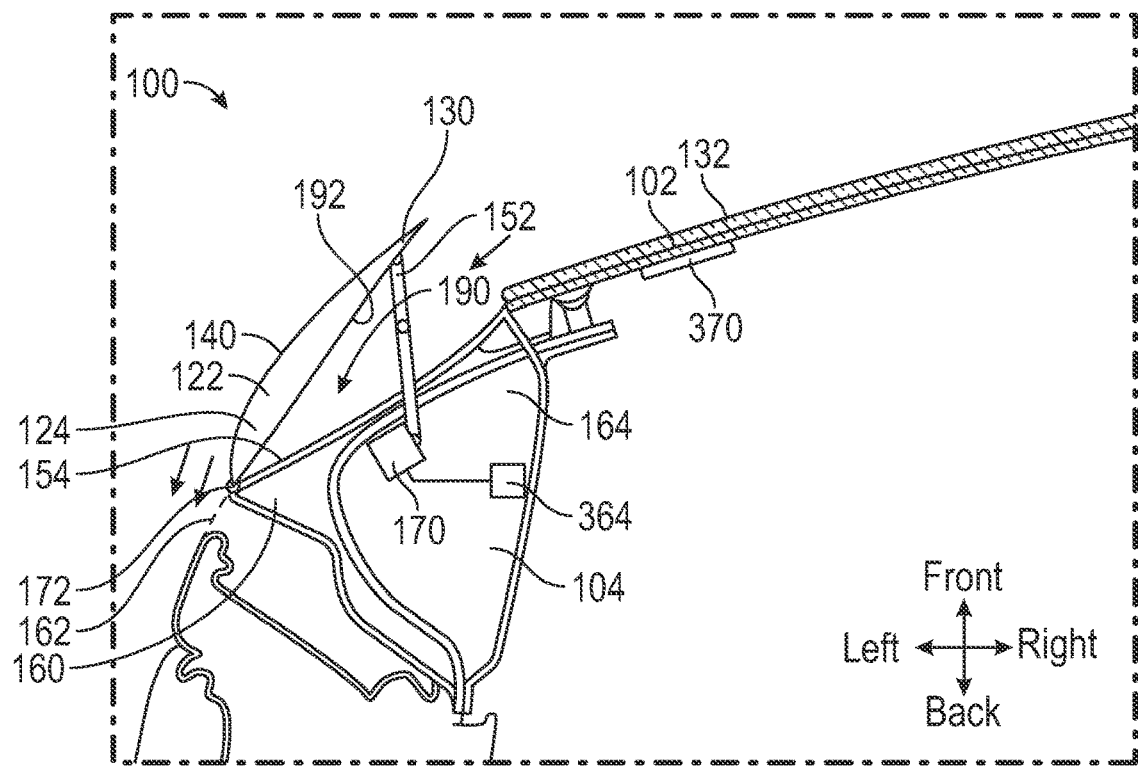
FIG. 5 is a cross-sectional view of the embodiment of the first fin assembly of FIG. 4 with the first fin in an extended condition.

When the fin 122 is in the extended condition, the fin 122 is configured to selectively form a gutter 190 with the first A-pillar 104. To this end, the fin 122 is more specifically positioned and oriented in a gutter position where the fin 122 and the first A-pillar 104 form the gutter 190, which is configured to substantially prevent liquid from traveling with the headwind across the windshield 102 in the lateral direction of the vehicle 100, around the first A-pillar 104 from the windshield 102 to the first side window 110, and contacting the first side window 110. FIG. 5 depicts the fin 122 in the gutter position with respect to the first A-pillar 104, where the arm 152 supports the first lateral side 124 of the fin 122 in contact with the exterior surface 154 of the first A-pillar 104, and the arm 152 supports the second lateral side 130 of the fin 122 spaced outward from the exterior surface 154 of the first A-pillar 104 such that the fin 122 and the first A-pillar 104 form the gutter 190 the exterior surface 154 of the first A-pillar 104 and an interior surface 192 of the fin 122 facing the first A-pillar 104, the interior surface 192 of the fin 122 being located on a side of the fin 122 opposite from the exterior surface 140 of the fin 122. The gutter 190 is disposed along the windshield 102, between the windshield 102 and the first side window 110 along the exterior surface 132 of the vehicle 100 in the lateral direction of the vehicle 100, and is configured to substantially prevent liquid from traveling with the headwind across the windshield 102 in the lateral direction of the vehicle 100, around the first A-pillar 104 with the headwind from the windshield 102 to the first side window 110, and contacting the first side window 110.

Figure 6:
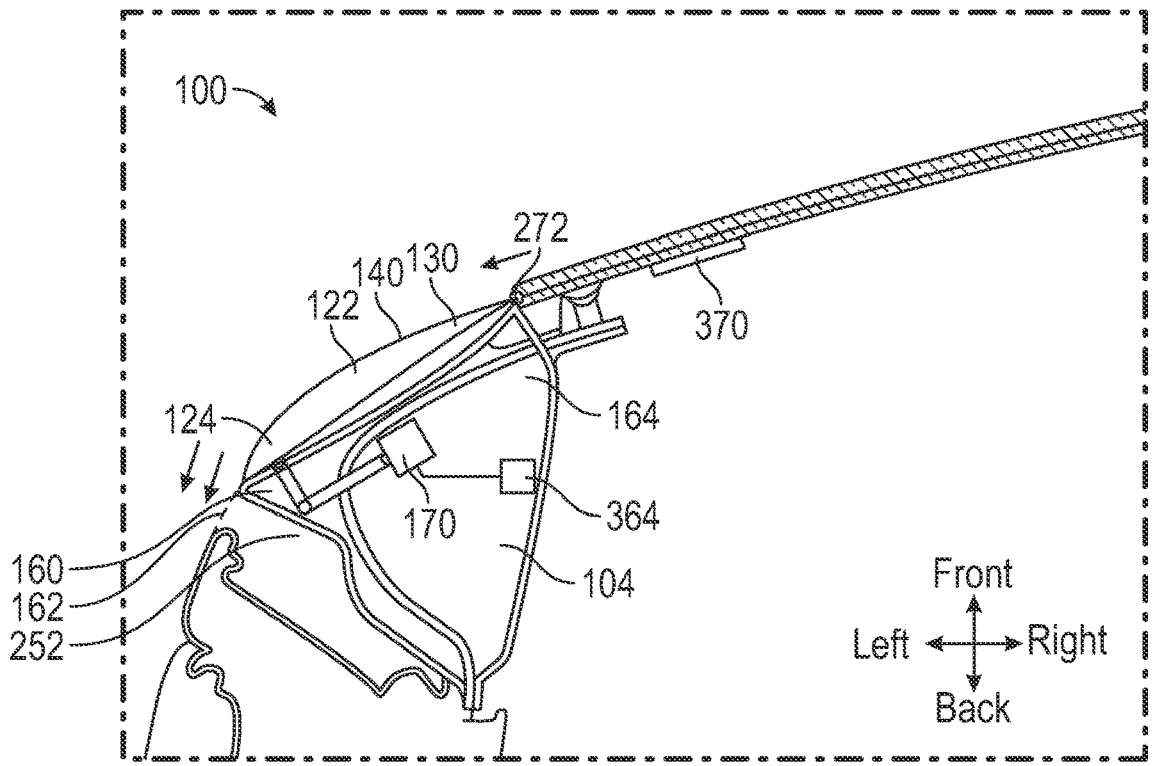
FIG. 6 is a cross-sectional view of an embodiment of the first fin assembly with the first fin in the retracted condition.

In an alternative embodiment, an arm supporting the fin 122 on the first A-pillar 104 is fixed to the first lateral side 124 of the fin 122, and a joint pivotally fixes the second lateral side 130 of the fin 122 with the second lateral side 164 of the first A-pillar 104. To this end, FIG. 6 depicts the fin 122 in the retracted condition with an arm 252 supporting the fin 122 on the first A-pillar 104, the arm 152 being fixed to the first lateral side 124 of the fin 122. As depicted, a joint 272 pivotally fixes the second lateral side 130 of the fin 122 to the second lateral side 164 of the first A-pillar 104. Unless otherwise stated, the arm 252 and the joint 272 respectively operate in a similar manner as described with reference to the arm 152 and the joint 272, and respectively have similar features as the arm 152 and the joint 172.

Figure 7:
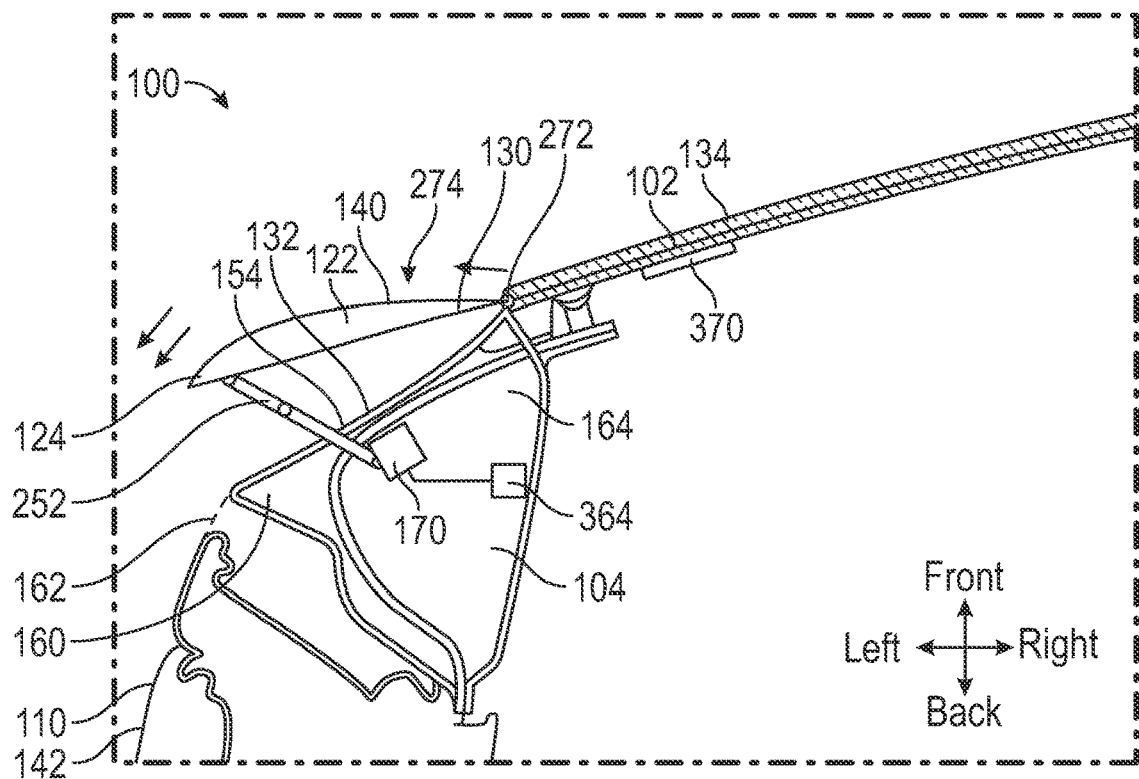
FIG. 7 is a cross-sectional view of the embodiment of the first fin assembly of FIG. 6 with the first fin in an extended condition.

As depicted in FIG. 7, when the fin 122 is in the extended condition, the fin 122 is configured to selectively form a guard 274. To this end, the fin 122 is more specifically positioned and oriented in a guard position with respect to the first A-pillar 104 where the fin 122 forms the guard 274, the fin 122 being extended from the exterior surface 132 of the vehicle 100 and configured to substantially prevent liquid traveling with the headwind across the windshield 102 in the lateral direction of the vehicle 100 from contacting the first side window 110. The arm 252 supports the first lateral side 124 of the fin 122 spaced outward from the exterior surface 154 of the first A-pillar 104 and the arm 252 supports the second lateral side 130 of the fin 122 in contact with the exterior surface 132 of the vehicle 100. In this manner, the guard 274 formed from the fin 122 is configured to separate the headwind from the exterior surface 132 of the vehicle 100 at a location along the exterior surface 132 of the vehicle 100 between the windshield 102 and the first side window 110, directing the headwind and liquid traveling with the headwind away from the exterior surface 132 of the vehicle 100 so as to substantially prevent liquid traveling with the headwind across the windshield 102 in the lateral direction of the vehicle 100 from flowing around the first A-pillar 104 and contacting the first side window 110.

Figure 8:
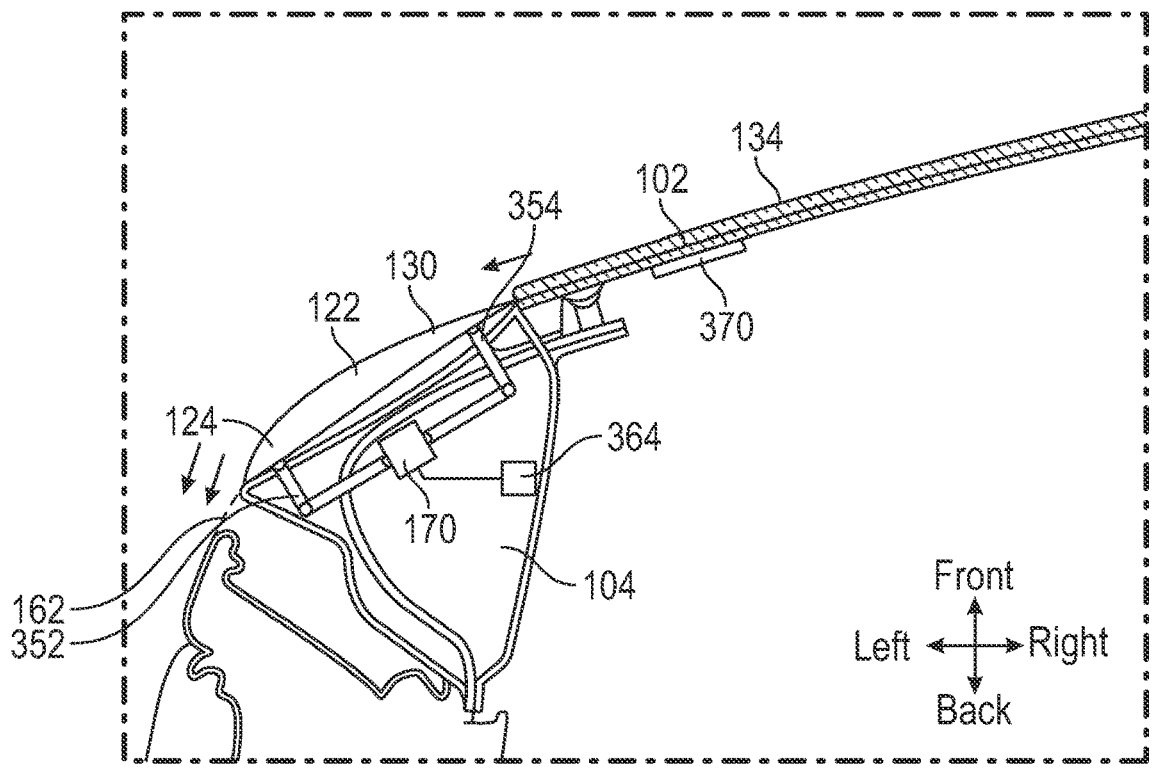
FIG. 8 is a cross-sectional view of an embodiment of the first fin assembly with the first fin in the retracted condition.

In an alternative embodiment, a first arm and a second arm collectively supporting the fin 122 on the first A-pillar 104 are respectively fixed to the first lateral side 124 of the fin 122 and the second lateral side 130 of the fin 122. To this end, FIG. 8 depicts the fin 122 in the retracted condition with a first arm 352 and a second arm 354 supporting the fin 122 on the first A-pillar 104, the first arm 352 and the second arm 354 being respectively fixed to the first lateral side 124 of the fin 122 and the second lateral side 130 of the fin 122. Unless otherwise stated, the first arm 352 and the second arm 354 each respectively operate in a similar manner as described with reference to the arm 152, and respectively have similar features as the arm 152.

Figure 9:
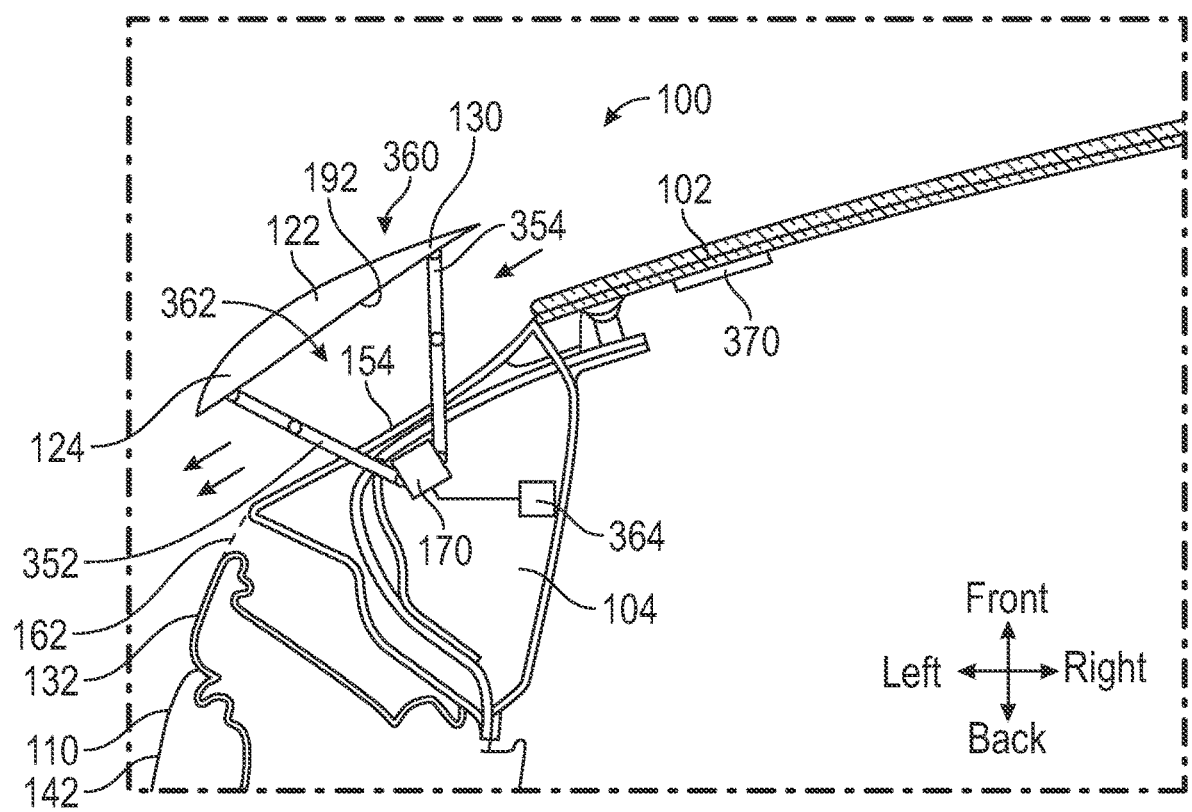
FIG. 9 is a cross-sectional view of the embodiment of the first fin assembly of FIG. 8 with the first fin in an extended condition.

As depicted in FIG. 9, when the fin 122 is in the extended condition, the fin 122 is configured to selectively form a deflector 360 with the exterior surface 132 of the vehicle 100. To this end, the fin 122 is more specifically positioned and oriented in a deflector position with respect to the first A-pillar 104 where the fin 122 forms the deflector 360 spaced from the exterior surface 132 of the vehicle 100 and configured to substantially prevent liquid traveling with the headwind across the windshield 102 in the lateral direction of the vehicle 100 from contacting the first side window 110. The first arm 352 supports the first lateral side 124 of the fin 122 spaced outward from the exterior surface 132 of the vehicle 100, and supports the second lateral side 130 of the fin 122 spaced outward from the exterior surface 132 of the vehicle 100. In this manner the fin 122 forms the deflector 360 spaced from the exterior surface 154 of the first A-pillar 104 to define a channel 362 between the exterior surface 154 of the first A-pillar 104 and the interior surface 192 of the fin 122. The channel 362 is configured to direct the headwind and liquid traveling with the headwind away from the exterior surface 132 of the vehicle 100, including the exterior surface 142 of the first side window 110, when the headwind passes through the channel 362. In this manner, the fin 122 is configured to direct the headwind through the channel 362 and away from the exterior surface 132 of the vehicle 100 so as to substantially prevent liquid from traveling with the headwind across the windshield 102 in the lateral direction of the vehicle 100, around the first A-pillar 104 from the windshield 102 to the first side window 110, and contacting the first side window 110.

FIGS. 4-9 depict a controller 364 configured to actuate the motor 170 and drive the fin 122 into and between the retracted condition from the extended condition in response to at least one of a user input and an input from a sensor 370 configured to detect an amount of liquid on the windshield 102. While the controller 364 is depicted as disposed in the first A-pillar 104 in circuit with the motor 170, the controller 364 may be alternatively disposed elsewhere in the vehicle 100 and may be a component of a vehicle ECU configured for actuating the motor 170 without departing from the scope of the present disclosure.

With reference to FIG. 4, the controller 364 actuates the motor 170 and directs the arm 152 to support the fin 122 in the retracted condition in response to at least one of a user command and an input from a sensor 370 disposed on the windshield 102 and configured to detect an amount of liquid on the windshield, the input from the sensor 370 to the controller 364 corresponding with less than a nominal amount of liquid detected on the windshield 102. A nominal amount of liquid detected on the windshield 102 by the sensor 370, traveling with the headwind in the lateral direction of the vehicle 100, results in a substantial amount liquid flowing over the exterior surface 132 of the vehicle 100 at the exterior surface 140 of the fin 122, to the first side window 110 from the windshield 102 in the lateral direction of the vehicle 100 when the fin 122 is in the retracted condition.

The controller 364 is configured to actuate the motor 170 and drive the fin 122 into the extended condition in response to at least one of a user command and an input from the sensor 370 configured to detect an amount of liquid on the windshield 102, the input from the sensor 370 to the controller 364 corresponding with at least a nominal amount of liquid detected on the windshield 102 by the sensor 370. As depicted in FIG. 5, the controller 364 is configured to actuate the motor 170 and direct the arm 152 to support the fin 122 in the gutter position in response to at least one of a user command and an input from the sensor 370 corresponding with a nominal amount of liquid detected on the windshield 102 by the sensor 370. As depicted in FIG. 7, the controller 364 is configured to actuate the motor 170 and drive the fin 122 into the guard position in response to at least one of a user command and an input from the sensor 370 configured to detect an amount of liquid on the windshield 102, the input from the sensor 370 to the controller 364 corresponding with at least a nominal amount of liquid detected on the windshield 102 by the sensor 370. A nominal amount of liquid detected on the windshield 102 by the sensor 370, traveling with the headwind across the exterior surface 132 of the vehicle 100 from the windshield 102 to the first A-pillar 104, results in liquid collected by the gutter 190 without a substantial amount of the liquid collected by the gutter 190 overflowing from the gutter 190 toward the first side window 110 in the lateral direction of the vehicle 100.

With reference to FIGS. 8 and 9, the first arm 352 and the second arm 354 are configured to support the fin 122 in any of the retracted condition, the gutter position, the guard position, and the deflector position as driven by the motor 170. When an input from the sensor 370 to the controller 364 corresponds with an amount of liquid between and including no liquid and less than a nominal amount of liquid detected on the windshield 102 by the sensor 370, the controller 364 directs the first arm 352 and the second arm 354 to support the fin 122 in the retracted condition. In an embodiment, when an input from the sensor 370 to the controller 364 corresponds with a nominal amount of liquid detected on the windshield 102, the controller 364 actuates the motor 170 to drive the fin 122 into the gutter position. In a further embodiment, when an input from the sensor 370 to the controller 364 corresponds with an amount of liquid in excess of the nominal amount detected on the windshield 102, the controller 364 actuates the motor 170 to drive the fin 122 in one of the guard position and the deflector position. An amount of liquid in excess of the nominal amount of liquid detected on the windshield 102 by the sensor 370, traveling with the headwind across the exterior surface 132 of the vehicle 100 in the lateral direction of the vehicle 100 toward the first side window 110, results in a substantial amount of liquid collected by the gutter 190 overflowing from the gutter 190 and toward the first side window 110 in the lateral direction of the vehicle 100 when the fin 122 is in the gutter position.

A method of operating the first fin assembly 120 includes providing the fin 122 supported on the first A-pillar 104 and disposed along the first A-pillar 104 at a location that is interposed between and separates the windshield 102 from the first side window 110 in the lateral direction of the vehicle 100, where the first lateral side 124 of the fin 122 is located closer to the first side window 110 as compared to the windshield 102, and the second lateral side 130 of the fin 122 is located closer to the windshield 102 as compared to the first side window 110. The method also includes providing the sensor 370 disposed on the windshield, the sensor being configured to detect an amount of liquid on the windshield.

The method includes driving the fin 122 to the retracted condition with respect to the first A-pillar 104 in response to at least one of a user command and an input from the sensor 370 configured to detect an amount of liquid on the windshield 102 such that the exterior surface 132 of the vehicle 100 at least partially formed along the exterior surface 134 of the windshield 102, the exterior surface 140 of the fin 122, and the exterior surface 142 of the first side window 110 in the lateral direction of the vehicle 100 substantially conforms to the aerodynamic shape 162 configured to facilitate and maintain attachment of the headwind of the vehicle 100 to the exterior surface 132 of the vehicle 100, the input from the sensor 370 corresponding with no liquid detected on the windshield 102 by the sensor 370. The method also includes driving the fin 122 to the extended condition with respect to the first A-pillar 104 in response to at least one of a user command and an input from the sensor 370 corresponding with liquid detected on the windshield 102, such that that the exterior surface 132 of the vehicle 100 is at least partially formed along the exterior surface 132 of the windshield 102, the exterior surface 154 of the first A-pillar 104 being located behind the fin 122 in the front-back direction of the vehicle 100, and the exterior surface 142 of the first side window 110. At least one of the first lateral side 124 of the fin 122 and the second lateral side 130 of the fin 122 are spaced outward from the exterior surface 154 of the first A-pillar 104, and the fin 122 is configured to substantially prevent liquid from traveling with the headwind across the windshield 102 in the lateral direction of the vehicle 100, around the the first A-pillar 104 from the windshield 102 to the first side window 110, and contacting the first side window 110 when the fin 122 is in the extended condition.

In an embodiment of the method, the step of driving the fin 122 into the extended condition includes driving the first lateral side 124 of the fin 122 into contact with the exterior surface 154 of the first A-pillar 104, and driving the second lateral side 130 of the fin 122 spaced outward from the exterior surface 154 of the first A-pillar 104 such that the fin 122 and the first A-pillar 104 form a gutter 190 with the interior surface 192 of the fin 122 and the exterior surface 154 of the first A-pillar 104. The gutter 190 is disposed along the windshield 102, between the windshield 102 and the first side window 110 along the exterior surface 132 of the vehicle 100, and the gutter 190 is configured to substantially prevent liquid from traveling with the headwind across the windshield 102 in the lateral direction of the vehicle 100, around the first A-pillar 104 from the windshield 102 to the first side window 110, and contacting the first side window 110.

In an embodiment of the method, the step of driving the fin 122 in the extended condition includes driving the first lateral side 124 of the fin 122 spaced outward from the exterior surface 154 of the first A-pillar 104 such that the fin 122 is configured to separate the headwind from the exterior surface of the vehicle 100 between the windshield 102 and the first side window 110 along the exterior surface 132 of the vehicle 100, directing the headwind and liquid traveling with the headwind away from the exterior surface 132 of the vehicle 100 so as to substantially prevent liquid from traveling with the headwind across the windshield 102 in the lateral direction of the vehicle, around the first A-pillar 104 from the windshield 102 to the first side window 110, and contacting the first side window 110.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fin assembly of a vehicle, the fin assembly comprising:
   a fin supported on an A-pillar and configured as an external covering for the A-pillar that extends from one lateral side of the A-pillar to another lateral side of the A-pillar in a lateral direction of the vehicle, with a first lateral side of the fin being located closer to a side window as compared to a windshield, and with a second lateral side of the fin being located closer to the windshield as compared to the side window,
   wherein an exterior surface of the A-pillar is offset in a front-back direction of the vehicle relative to an exterior surface of the windshield and defines a recessed portion,
   wherein the fin is configured for being driven to a retracted condition with respect to the A-pillar and to an extended condition with respect to the A-pillar,
   where in the retracted condition the fin is positioned over the recessed portion such that an exterior surface of the vehicle at least partially formed along the exterior surface of the windshield, an exterior surface of the fin, and an exterior surface of the side window substantially conforms to an aerodynamic shape, and
   where in the extended condition the exterior surface of the vehicle is at least partially formed along the exterior surface of the windshield, the exterior surface of the A-pillar, and the exterior surface of the side window, and at least one of the first lateral side of the fin and the second lateral side of the fin is spaced outward from the recessed portion at least partially defined by the exterior surface of the A-pillar to prevent liquid from traveling around the A-pillar from the windshield to the side window.

2. The fin assembly according to claim 1, wherein when the fin is in the retracted condition the exterior surface of the fin is aligned with the exterior surface of the side window at the first lateral side of the fin such that the exterior surface of the fin substantially continues a curve of the exterior surface of the side window at the first lateral side of the fin, and the exterior surface of the fin is aligned with the exterior surface of the windshield at the second lateral side of the fin such that the exterior surface of the fin substantially continues a curve of the exterior surface of the windshield at the second lateral side of the fin.

3. The fin assembly according to claim 1, wherein when the fin is in the extended condition, the fin is in a gutter position to form a gutter with the A-pillar such that the first lateral side of the fin in contact with the exterior surface of the A-pillar and the second lateral side of the fin is spaced outward from the exterior surface of the A-pillar, the gutter being configured to prevent liquid from traveling around the A-pillar from the windshield to the side window.

4. The fin assembly according to claim 3, further comprising a controller configured to drive the fin into the gutter position in response to at least one of a user command and an input from a sensor configured to detect an amount of liquid on the windshield, the input from the sensor to the controller corresponding with a nominal amount of liquid detected on the windshield.

5. The fin assembly according to claim 4, wherein when the fin is in the extended condition, the fin is in a guard position to form a guard such that the first lateral side of the fin is spaced outward from the exterior surface of the A-pillar, and the second lateral side of the fin is in contact with the exterior surface of the vehicle, the guard being configured to separate a headwind from the exterior surface of the vehicle at a location between the windshield and the side window along the exterior surface of the vehicle, directing the headwind and liquid traveling with the headwind away from the exterior surface of the vehicle so as to prevent liquid traveling with the headwind around the A-pillar from contacting the side window, and wherein the controller is configured to drive the fin into the guard position in response to input corresponding with an amount of liquid in excess of the nominal amount detected on the windshield by the sensor.

6. The fin assembly according to claim 4, wherein when the fin is in the extended condition, the fin is in a deflector position to form a deflector with the exterior surface of the vehicle such that the first lateral side of the fin is spaced outward from the exterior surface of the vehicle, and the second lateral side of the fin is spaced outward from the exterior surface of the vehicle, the deflector being configured to direct a headwind between the fin and the exterior surface of the A-pillar, away from the exterior surface of the vehicle so as to prevent liquid traveling with the headwind around the A-pillar from contacting the side window, and wherein the controller is configured to drive the fin into the deflector position in response to input corresponding with an amount of liquid in excess of the nominal amount detected on the windshield by the sensor.

7. The fin assembly according to claim 1, wherein when the fin is in the extended condition, the fin is in a guard position to form a guard such that the first lateral side of the fin is spaced outward from the exterior surface of the A-pillar, and the second lateral side of the fin is in contact with the exterior surface of the vehicle, the guard being configured to separate a headwind from the exterior surface of the vehicle at a location between the windshield and the side window along the exterior surface of the vehicle, directing the headwind and liquid traveling with the headwind away from the exterior surface of the vehicle so as to prevent liquid traveling with the headwind around the A-pillar from contacting the side window.

8. The fin assembly according to claim 7, further comprising a controller configured to drive the fin into the guard position in response to at least one of a user command and an input from a sensor configured to detect an amount of liquid on the windshield, the input from the sensor to the controller corresponding with at least a nominal amount of liquid detected on the windshield by the sensor.

9. The fin assembly according to claim 1, wherein when the fin is in the extended condition, the fin is in a deflector position to form a deflector with the exterior surface of the vehicle such that the first lateral side of the fin is spaced outward from the exterior surface of the vehicle, and an arm supports the second lateral side of the fin spaced outward from the exterior surface of the vehicle, the deflector being configured to direct a headwind between the fin and the exterior surface of the A-pillar, away from the exterior surface of the vehicle to prevent liquid traveling with the headwind around the A-pillar from contacting the side window.

10. The fin assembly according to claim 9, further comprising a controller configured to drive the fin into the deflector position in response to at least one of a user command and an input from a sensor configured to detect an amount of liquid on the windshield, the input from the sensor to the controller corresponding with at least a nominal amount of liquid detected on the windshield by the sensor.

11. The fin assembly according to claim 1, further comprising a controller configured to drive the fin into the retracted condition in response to at least one of a user command and an input from a sensor configured to detect an amount of liquid on the windshield, the input from the sensor to the controller corresponding with less than a nominal amount of liquid detected on the windshield by the sensor.

12. The fin assembly according to claim 1, further comprising an arm fixed to the A-pillar to support the fin on the A-pillar in the retracted condition and the extended condition; and a motor mechanically connected to the fin through the arm, the motor being configured to drive the fin with the arm to and between the retracted condition and the extended condition.

13. The fin assembly according to claim 1, further comprising an arm fixed to the A-pillar to support the fin on the A-pillar in the retracted condition and the extended condition, wherein the first lateral side of the fin is pivotally fixed to the A-pillar via a joint, and the arm supports the fin on the A-pillar at the second lateral side of the fin such that when the fin is driven from the retracted condition to the extended condition the fin pivots in an outboard direction of the vehicle at the joint.

14. A fin assembly for a vehicle, the fin assembly comprising:

a fin supported on an A-pillar and disposed along the A-pillar at a location that is interposed between and separates a side window and a windshield in a lateral direction of the vehicle, with a first lateral side of the fin being located closer to the side window as compared to the windshield, and with a second lateral side of the fin being located closer to the windshield as compared to the side window, wherein the fin is configured for being driven to a retracted condition with respect to the A-pillar and to an extended condition with respect to the A-pillar, where in the retracted condition an exterior surface of the fin approximately covers in the lateral direction of the vehicle an entirety of an exterior surface of the A-pillar such that an exterior surface of the vehicle is at least partially formed along an exterior surface of the windshield, the exterior surface of the fin, and an exterior surface of the side window in the lateral direction of the vehicle, the exterior surface of the fin being substantially flush with the exterior surface of the windshield and the exterior surface of the side window, and where in the extended condition the exterior surface of the vehicle is at least partially formed along the exterior surface of the windshield, the exterior surface of the A-pillar, and the exterior surface of the side window, where in the extended condition the fin is in a gutter position to form a gutter with the A-pillar such that the first lateral side of the fin is in contact with the exterior surface of the A-pillar and the second lateral side of the fin is spaced outward from the exterior surface of the A-pillar, the gutter being formed with an interior surface of the fin extended from the first side to the second side of the fin and the exterior surface of the A-pillar extended beneath the fin from the first side to the second side of the fin, the putter configured to prevent liquid from traveling around the A-pillar from the windshield to the side window.

15. The fin assembly according to claim 14, wherein when the fin is in the retracted condition, the first lateral side of the fin contacts a first lateral side of the A-pillar at the exterior surface of the A-pillar such that the exterior surface of the vehicle substantially conforms to an aerodynamic shape, the first lateral side of the A-pillar being located closer to the side window as compared to the windshield in the lateral direction of the vehicle, and wherein when the fin is in the retracted condition, the second lateral side of the fin contacts at least one of the windshield and a second lateral side of the A-pillar at the exterior surface of the A-pillar such that the exterior surface of the vehicle substantially conforms to the aerodynamic shape, the second lateral side of the A-pillar being located closer to the windshield as compared to the side window in the lateral direction of the vehicle.

16. A method of operating a fin assembly for a vehicle, the method comprising:

providing a fin supported on an A-pillar and configuring the fin an external covering for the A-pillar that extends from one lateral side of the A-pillar to another lateral side of the A-pillar in a lateral direction of the vehicle, wherein a first lateral side of the fin is located closer to a side window as compared to a windshield, and a second lateral side of the fin is located closer to the windshield as compared to the side window, wherein an exterior surface of the A-pillar is offset in a front-back direction of the vehicle relative to an exterior surface of the windshield and define a recessed portion;

providing a sensor disposed on the windshield, wherein the sensor is configured to detect an amount of liquid on the windshield;

driving the fin to a retracted condition with respect to the A-pillar in response to at least one of a first user command and an input from the sensor such that the fin is positioned over the recessed portion and an exterior surface of the vehicle at least partially formed from the exterior surface of the windshield, the exterior surface of the fin, and an exterior surface of a side window substantially conforms to an aerodynamic shape; and driving the fin to an extended condition with respect to the A-pillar in response to at least one of a user command and an input from the sensor such that that the exterior surface of the vehicle is at least partially formed along the exterior surface of the windshield, the exterior surface of the A-pillar, and the exterior surface of the side window, wherein at least one of the first lateral side of the fin and the second lateral side of the fin are spaced outward from the exterior surface of the A-pillar.

17. The method of claim 16, wherein the step of driving the fin into the extended condition includes driving the second lateral side of the fin spaced outward from the exterior surface of the A-pillar such that the fin and the A-pillar form a gutter disposed along the windshield, between the windshield and the side window along the exterior surface of the vehicle in the lateral direction of the vehicle, and configured to prevent liquid from traveling around the A-pillar from the windshield to the side window.

18. The method of claim 16, wherein the step of driving the fin in the extended condition includes driving the first lateral side of the fin spaced outward from the exterior surface of the A-pillar such that the fin is configured to separate the headwind from the exterior surface of the vehicle, directing the headwind and liquid traveling with the headwind away from the exterior surface of the vehicle to prevent liquid traveling with the headwind around the A-pillar from contacting the side window.

* * * * *